(12) United States Patent
Yamamoto et al.

(10) Patent No.: US 6,631,190 B1
(45) Date of Patent: Oct. 7, 2003

(54) TELEPHONE SYSTEM

(75) Inventors: Koichi Yamamoto, Fukuoka (JP); Toshihiko Sakata, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/442,926

(22) Filed: Nov. 18, 1999

(30) Foreign Application Priority Data

Nov. 18, 1998 (JP) .......................................... 10-327829

(51) Int. Cl.⁷ ................................................ H04M 1/00
(52) U.S. Cl. .................. 379/380; 379/399.01; 379/382; 379/377
(58) Field of Search .................. 379/257, 361, 379/377, 379, 380, 381, 382, 387, 388.06, 399.01, 413.01, 413.02, 414

(56) References Cited

U.S. PATENT DOCUMENTS

| | | | | |
|---|---|---|---|---|
| 4,025,730 A | * | 5/1977 | Sawai | 379/399.01 |
| 4,817,137 A | * | 3/1989 | Rosenfeld et al. | 379/377 |
| 5,850,436 A | * | 12/1998 | Rosen et al. | 379/377 |
| 6,134,321 A | * | 10/2000 | Pitsch | 379/399 |
| 6,240,177 B1 | * | 5/2001 | Guntzburger et al. | 379/387 |
| 6,487,282 B1 | * | 11/2002 | Xia et al. | 379/106.03 |

* cited by examiner

Primary Examiner—Rexford Barnie
(74) Attorney, Agent, or Firm—RatnerPrestia

(57) ABSTRACT

A telephone system capable of judging kinds of various signals (line input signals) obtained through a line is disclosed, that enables reduction of the number of parts, detection with high accuracy, reduction of a mounting area, and reduction in costs. The telephone system includes an A/D converter for making A/D conversion of the line input signal such as a CPC signal, a bell signal, and a usage state signal indicating a telephone line usage state to output a digital line input signal, and a frequency analyzing unit for making frequency analysis of the digital signal converted by the A/D converter, and the central processing unit judges the kind of the line input signal based on a result of the frequency analyzing unit.

4 Claims, 2 Drawing Sheets

TELEPHONE SYSTEM

FIELD OF THE INVENTION

The present invention relates to a telephone system capable of judging kinds of various signals (line input signals) obtained through a telephone line.

BACKGROUND OF THE INVENTION

A related art telephone system detects various signals (telephone line input signals) obtained through a telephone line by separately providing circuits for the respective signals. For example, in response to hanging up by a counterpart, an exchange equipment generates a calling party control (hereinafter called CPC) signal, a bell signal for calling, a usage state signal indicating a telephone line usage state, etc. The exchange equipment is provided with circuits individually for the respective signals.

A related art telephone system is described below with reference to the drawing. FIG. 2 is a circuit diagram showing a related art telephone system. The related art telephone system is constituted by a telephone line 21, a bell signal detecting circuit 22, a parallel telephone monitor circuit 23 for monitoring a telephone system connected in parallel, a CPC signal detecting circuit 24, a CPU 25 for processing a signal from each detecting circuit, a diode bridge 26 for rectification, a relay circuit 27 for capturing a telephone line, and a call-termination tone (hereinafter called CTT) detecting circuit 28.

The thus constructed related art telephone system operates as follows. A bell signal inputted through the telephone line 21 passes through a resistor and a capacitor of the bell signal detecting circuit 22, and turns on a transistor Tr1 of a photocoupler. In the case of responding to this bell signal, the CPU 25 closes the relay circuit 27 and instructs it to capture the telephone line.

When the telephone system captures the line and responds, if a telephone system connected in parallel is put into an off-hook state, a voltage (tip-ring voltage) XV between the tip and the ring of the telephone system changes. By this voltage change, the parallel telephone monitor circuit 23 detects the voltage change of the tip-ring voltage, and turns off a transistor Tr2. By this operation, an "H" level signal is inputted to an input terminal T2 of the CPU 25. On the other hand, when the parallel telephone system is put into an on-hook state, the tip-ring voltage increases, the transistor Tr2 is turned on, and an "L" level signal is inputted to the input terminal T2 of the CPU 25.

The CPU 25 detects inversion of logic of the signal inputted to the terminal T2, and judges that the parallel telephone system is put into an off-hook state. By this judgement, the telephone system cuts off the relay circuit 27 and shifts to a standby state.

Some exchange equipment cuts off the line for about 8 msec when a caller side makes an on-hook operation. A signal outputted at this time is a CPC signal (one of usage state signals), and a circuit for detecting this CPC signal is the CPC detecting circuit 24. In the CPC detection circuit 24, since a transistor Tr3 is normally turned on (during non-detection of the CPC signal), an "L" level signal is outputted to an input terminal T3 of the CPU 25. However, when the line is cut off, the transistor Tr3 is turned off, and an "H" level signal is outputted to the input terminal T3 of the CPU 25. When this "H" level signal is detected, the telephone system judges that the caller has hung up, and opens the telephone line. In the case of an automatic answering telephone set, when this "H" level signal is detected, the telephone system judges that the caller has hung up, so that recording is ended and the telephone line is opened.

Some exchange equipment does not output a CPC signal when a caller makes an on-hook operation but outputs a call-termination tone of from 40 to 600 Hz, or becomes quite silent. The call-termination tone detecting circuit 28 outputs an "H" (or "L") level signal to an input terminal T4 of the CPU 25 when there is a sound, or outputs an "L" (or "H") level signal to the input terminal T4 of the CPU 25 when there is no sound. The call-termination tone is either a continuous sound or a discontinuous sound having a constant period.

If a normal sound signal is inputted, the CTT detecting circuit 28 irregularly outputs an "H" level signal and an "L" level signal.

Thus, the CPU 25 monitors whether the output from the CTT detecting circuit 28 is (a) fixed to an "H" level (at detection of continuous sound),
(b) fixed to an "L" level (at detection of no sound), or
(c) a signal periodically changing between the "H" level and the "L" level (at detection of discontinuous sound having a constant period).

In either one of the foregoing cases (a), (b), and (c), it is judged that a caller side has made an on-hook operation.

If the output from the CTT circuit 28 is a signal that irregularly changes between the "H" level and the "L" level, it is judged that the signal is a normal sound signal.

However, in the foregoing related art telephone system, since circuits are individually provided for different signals and detection is made, there has been a problem that the number of parts constituting the circuits is increased and a mounting area of a circuit substrate is enlarged. Besides, since all circuits are constituted by resistors, capacitors, transistors (photocouplers), and the like, there has been a problem that fluctuation in the case of mass production is large, and it is impossible to secure detection performance with high accuracy.

SUMMARY OF THE INVENTION

The present invention is aimed to provide a telephone system which solves the foregoing problems and enables reduction of the number of parts, detection with high accuracy, reduction of a mounting area, and reduction in costs.

In order to achieve this, a telephone system of the present invention comprises an A/D converter for making A/D conversion of a line input signal such as a CPC signal, a bell signal, and a usage state signal indicating a telephone line usage state to output a digital line input signal; and a central processing unit for judging a kind of the line input signal based on a line corresponding signal corresponding to the digital line input signal. By this construction, the telephone system of the invention enables reduction of the number of parts, detection with high accuracy, reduction of a mounting area, and reduction in costs.

The central processing unit of the telephone system of the invention judges the kind of the line input signal based on a voltage change value of the line corresponding signal or a frequency component thereof. By this judgement, in the telephone system of the invention, the kind of the line input signal can be accurately judged based on the line corresponding signal.

DETAILED DESCRIPTION OF THE PREFERRED EMBODIMENTS

An embodiment of the present invention is described below with reference to FIG. 1.

Figure 1:
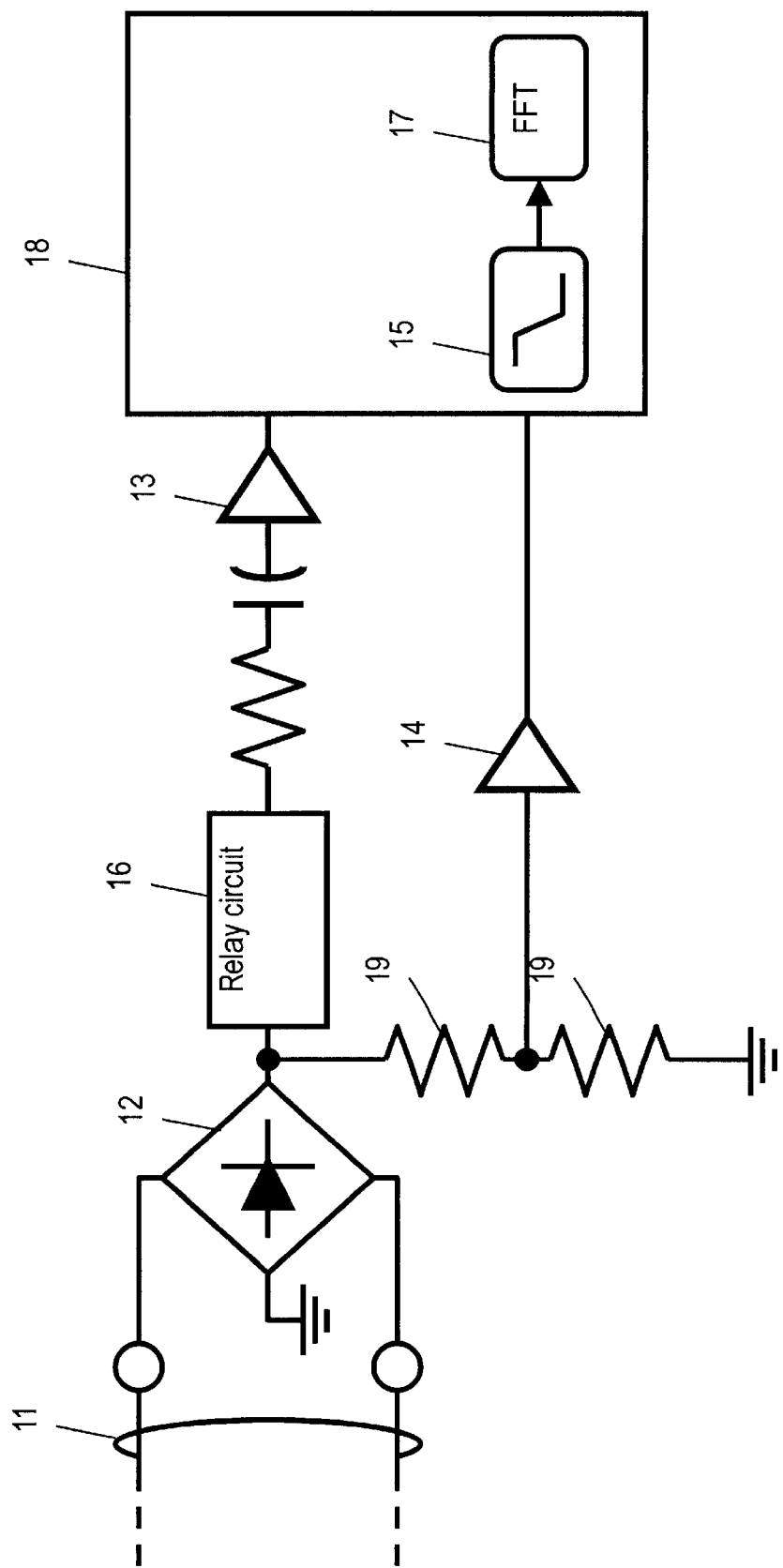
FIG. 1 is a circuit diagram showing a telephone system according to an embodiment of the invention.
Figure 2:
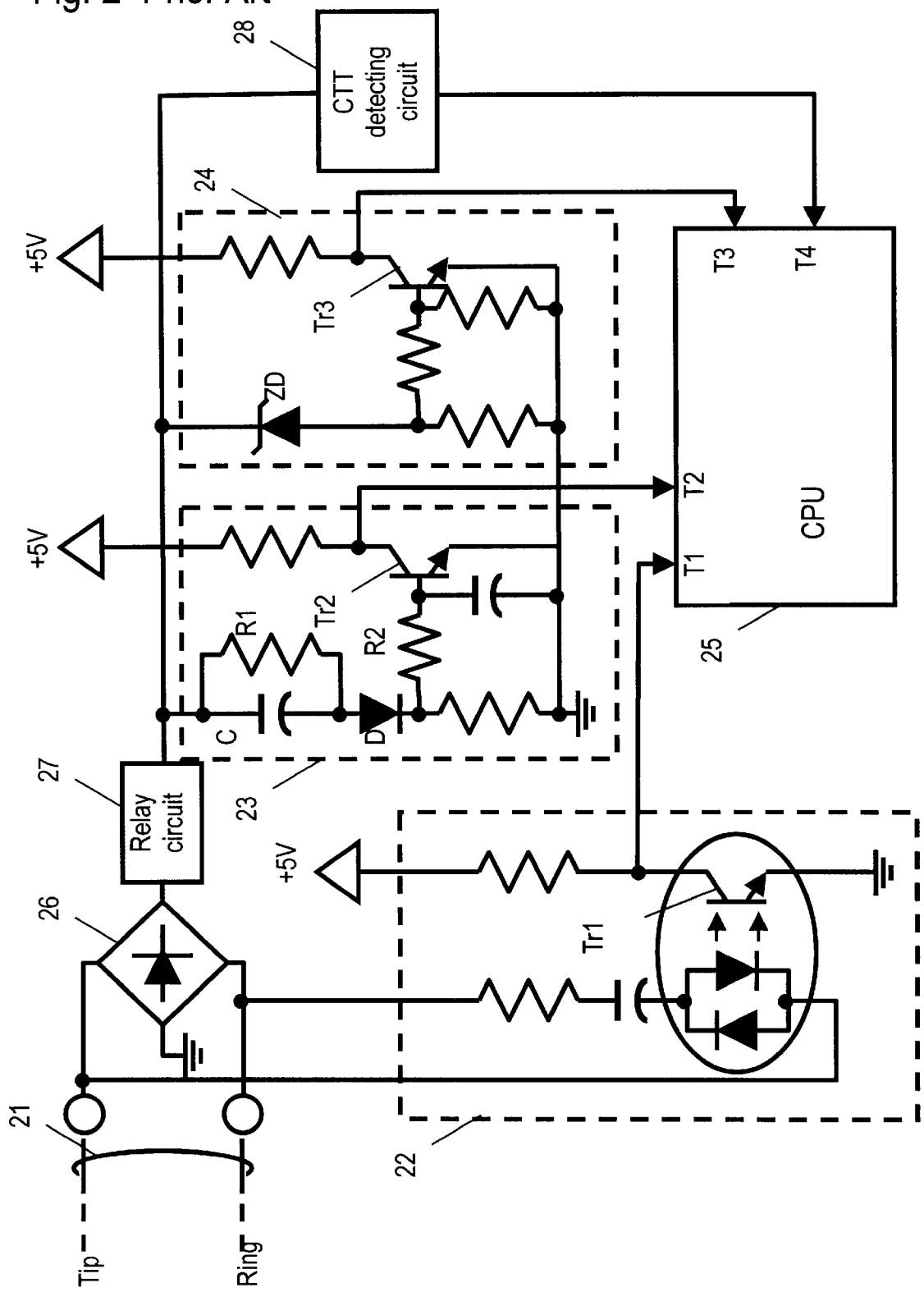
FIG. 2 is a circuit diagram showing a related art telephone system.

FIG. 1 is a circuit diagram showing a telephone system according to an embodiment of the invention. In FIG. 1, a diode bridge 12 for rectification rectifies an alternating current incoming through a telephone line 11. A relay circuit 16 captures a line. Resistors 19 and 20 divide a line voltage. A first A/D converter 13 and a second A/D converter 14 convert an incoming signal into a digital signal, respectively. A central processing unit (CPU) 18 processes a signal from each circuit. In the central processing unit (CPU) 18, a digital LPF (digital low pass filter) 15 and an FFT (fast Fourier transformer) 17 for frequency analysis are structured. The digital LPF 15 and the FFT 17 are realized in the central processing unit 18 (CPU). The digital LPF 15 and the FFT 17 may be realized in software or may also be realized in hardware.

With respect to the thus constructed telephone system, a detecting operation of each line input signal is described. As the kinds of the line input signals, as described above, there are a bell signal and a usage state signal. The usage state signal includes a parallel telephone off-hook signal and a caller side on-hook signal. The caller side on-hook signal includes a CPC signal and a call-termination tone signal (or soundless signal).

The bell signal inputted through the telephone line 11 is inputted to the first A/D converter 13. At this time, a bell signal in which its level is lowered by division with the resistors 19 and 20 is inputted to the second converter 14.

The bell signal passes through the diode bridge 12 for rectification and is subjected to A/D conversion by the first A/D converter 13 to be converted into a digital bell signal (one of digital line input signals). After only a low-frequency region of the digital bell signal is made to pass through the digital LPF 15, it is subjected to fast Fourier transform by the FFT 17 of the CPU 18, and detection of a frequency component is carried out.

Since the frequency component of the bell signal is about 16 Hz to 80 Hz, if a detection result obtained by fast Fourier transform at the FFT 17 satisfies that, the CPU 18 judges that the bell signal is incoming. If a signal having a frequency other than this frequency is inputted, the CPU 18 judges that the signal is not a bell signal, and makes control so that a bell of the telephone system is not rung or an automatic answering telephone set does not respond to an incoming call.

When the CPU 18 judges that a bell signal is incoming, it makes control so that the bell is rung, and response to the incoming call is started in the case of the automatic answering telephone set. In the processing of the response to the incoming call, the relay circuit 16 is operated to capture the line, and a response message, etc. are sent out. Incidentally, detection of the bell signal is also described later.

Next, monitoring of a parallel telephone system is described. When the telephone system captures a line, if a telephone system connected in parallel is put into an off-hook state, a voltage (tip-ring voltage) between the tip and the ring of the telephone system changes. Also if another telephone system connected in parallel is put into an off-hook state while the telephone system that has detected the bell signal is suspended, the voltage (tip-ring voltage) between the tip and the ring of the telephone system changes. In these cases, the change of the voltage between the tip and the ring can be said to be a usage state signal indicating a telephone line usage state. In these cases, similarly to the case of the bell signal, a line voltage (line input signal voltage) in which its voltage has been dropped by resistor division is inputted to the second A/D converter 14.

When another telephone system connected in parallel is put into an off-hook state and the potential of the voltage XV between the tip and the ring of the telephone system (tip-ring voltage) is dropped (for example, dropped to 10 V), the voltage inputted to the second A/D converter 14 also changes in accordance with the drop width.

For the purpose of improving sound quality of digital recording, the number of bits of the A/D converter increases, and its resolution becomes high. Here, the second A/D converter 14 is an 8-bit A/D converter. Since a voltage of a telephone line is generally 48 V, a resistor dividing ratio is determined such that a voltage inputted to the second A/D converter 14 becomes about 5 V. In accordance with the division ratio, the values of the resistors 19 and 20 are determined. The correspondence between the analog value of the off-hook signal from the parallel telephone system and the digital value outputted from the A/D converter 14 becomes as shown in Table 1.

If the parallel telephone system is put into an off-hook state, a predetermined voltage change (for example, from 12 V to 10 V) occurs in the telephone line 11. The CPU 18 receives the above voltage change through the A/D converter 14, and detects the off-hook state. In this way, the off-hook signal from the parallel telephone system is detected.

TABLE 1

| Digital value | Analog value |
| --- | --- |
| 00000000 | 0 to 0.1875 V |
| 00G00001 | 0.1876 to 0.3751 V |
| 00000010 | 0.3752 to 0.5627 V |
| 00000011 | 0.5628 to 0.7503 V |
| . | . |
| . | . |
| . | . |
| 11111100 | 47.2867 to 47.4327 V |
| 11111101 | 47.4373 to 47.6248 V |
| 11111110 | 47.6249 to 47.8124 |
| 11111111 | 47.8125 to 48 V |

If this telephone system is an automatic answering telephone set, a response message signal is sometimes sent out to the telephone line. In general, when there is no sound signal, a line input signal voltage (line voltage) is stable. However, when a response message signal is sent out to the telephone line or a high level sound is incoming, the line voltage is varied by the variation of the sound signal level. Since a maximum value of a normally conceivable sound signal level is 0 dBm (=0.775 V), a digital value subjected to A/D conversion by the A/D converter 14 changes, and it becomes difficult to judge whether the parallel telephone system has been put into an off-hook state.

In view of the fact that a band width of a signal transmitted through a telephone line from 300 Hz to 3 kHz and that a frequency of a bell signal is from 16 Hz to 78 Hz characteristics of the digital LPF 15 are designed such that a passing band width is 100 Hz or less, and an attenuation amount in a blocking region is made 30 dB. By doing so, a voltage change by a sound signal of 0 dBm is suppressed to 0.024 V (digital value becomes 00000000 from Table 1), so that erroneous detection due to the sound signal is eliminated.

Next, detection of a CPC signal from an exchange equipment is described. There is a case where the CPC signal is outputted from the exchange equipment when a caller side (the counterpart) makes an on-hook operation. If the exchange equipment outputs the CPC signal, a change in the voltage level inputted to the first A/D converter 13 becomes larger than the case where the parallel telephone system is put into an off-hook state. By this voltage change, it is possible to detect the CPC signal.

If the telephone system is an automatic answering telephone set, a sound signal incoming through a line is converted into a digital signal and recorded. In this case, the sound signal is subjected to A/D conversion by the second A/D converter 14. The digital sound signal from this A/D converter 14 is sent to the FFT 17 through the digital LPF 15.

Like this, the digital sound signal converted by the A/D converter 14 is made pass through the digital LPF 15 and subjected to fast Fourier transform by the FFT 17, so that analysis of a spectrum is carried out. By this analysis of the spectrum, it becomes possible to detect a call-termination tone or a soundless state. That is, although the spectrum changes with time if the sound signal is inputted, the spectrum becomes stable with a peak of from 400 to 600 Hz if a caller puts a telephone system in an on-hook state so that the call-termination tone is outputted from the exchange equipment. In the case of soundless state, a noise is merely detected, and such a state occurs that a peak does not exist in the spectrum.

By judging the spectrum distribution with the CPU 18 like this, it is possible to distinguish the normal sound signal, call-termination tone, and soundless state, and by that, it is possible to distinguish the on-hook operation at the caller side from the normal sound signal. Incidentally, judgement of the spectrum distribution is naturally performed to the digital line input signal inputted to the digital LPF 15.

As described above, this embodiment is provided with the A/D converters 13, 14 for making A/D conversion of the line input signal (for example, a CPC signal, a bell signal, a usage state signal indicating a telephone line usage state, etc.) to output a digital line input signal, and the central processing unit 18 for judging the kind of the line input signal based on a line corresponding signal corresponding to a digital line input signal. This central processing unit 18 judges the kind of the line input signal based on a voltage change value or frequency component of the line corresponding signal. By this judgement, it is possible to accurately judge the kind of each line input signal. In this embodiment, since detection is carried out through digital signals, the accuracy is high and fluctuation can be eliminated.

Besides, as compared with the related art structure where detecting circuits are individually provided for the respective line input signals, the number of parts can be reduced, and the fluctuation of parts can be suppressed so that high accuracy detection can be made. Further, such advantageous effects can be obtained that a mounting area can be decreased, and costs can be reduced since the number of parts is small. Incidentally, in a digital speaker phone or a device for digitally recording an incoming sound, since the A/D converter 14 can be used also as an A/D converter for processing a sound, it is not necessary to newly add an A/D converter.

What is claimed is:

1. A telephone system comprising
   a rectifying unit for rectifying an alternating current incoming through a telephone line;
   a relay circuit for capturing a line;
   a voltage dividing resistor for dividing a line voltage;
   a second A/D converter;
   a digital low pass filter;
   a fast Fourier transformer for frequency analysis; and
   a central processing unit for processing a signal from each circuit, wherein
   in a state where the relay circuit for capturing a line captures a line, a voltage change between a tip and a ring of the telephone line is dropped by the voltage dividing resistor and then inputted to the second A/D converter; and
   the central processing unit detects the voltage change based on a digital bell signal outputted from the second A/D converter to recognize that a telephone system connected in parallel is put into an off-hook state.

2. A telephone system comprising
   a rectifying unit for rectifying an alternating current incoming through a telephone line;
   a relay circuit for capturing a line;
   a voltage dividing resistor for dividing a line voltage;
   a first A/D converter for converting the line voltage into a digital signal;
   a second A/D converter for converting a voltage dropped by the voltage dividing resistor into a digital signal;
   a digital low pass filter;
   a fast Fourier transformer for frequency analysis; and
   a central processing unit for processing a signal from each circuit, wherein
   in a state where the relay circuit for capturing a line captures a line, a voltage change between a tip and a ring of the telephone line is dropped by the voltage dividing resistor and the inputted to the second A/D converter; and
   the central processing unit detects the voltage change based on a digital bell signal outputted from the second A/D converter to recognize that a telephone system connected in parallel is put into an off-hook state, and
   when a level of voltage inputted to the first A/D converter changes, and if it is larger than the case where the parallel telephone system is put into an off-hook state, the central processing unit recognizes that the voltage is a CPC signal issued from an exchange equipment.

3. A telephone system comprising
   a rectifying unit for rectifying an alternating current incoming through a telephone line;
   a second A/D converter;
   a digital low pass filter;
   a fast Fourier transformer for frequency analysis; and
   a central processing unit for processing a signal from each circuit, wherein
   a sound signal incoming through the line is converted into a digital signal by the second A/D converter, the converted digital signal passes through the digital low pass filter to enter the fast Fourier transformer, and the signal is subjected to fast Fourier transform by the fast Fourier transformer; and
   the central processing unit recognizes that a call-termination tone is inputted if an analysis result by the fast Fourier transformer is a stable spectrum having a predetermined frequency band width.

4. A telephone system according to claim 3, wherein the central processing unit recognizes that a soundless signal is inputted if the analysis result of the fast Fourier transformer indicates that a peak does not exist in a predetermined frequency band width.

* * * * *